US010938515B2

United States Patent
Soultan et al.

(10) Patent No.: US 10,938,515 B2
(45) Date of Patent: Mar. 2, 2021

(54) INTELLIGENT COMMUNICATION MESSAGE FORMAT AUTOMATIC CORRECTION

(71) Applicant: INTERNATIONAL BUSINESS MACHINES CORPORATION, Armonk, NY (US)

(72) Inventors: Hesham Soultan, Giza (EG); Alaa Youssef, Valhalla, NY (US); Nader M. Nassar, Yorktown Heights, NY (US); Tamer M. Nassar, Fairfield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 154 days.

(21) Appl. No.: 16/116,879

(22) Filed: Aug. 29, 2018

(65) Prior Publication Data
US 2020/0076538 A1 Mar. 5, 2020

(51) Int. Cl.
*H04L 1/08* (2006.01)
*H04L 29/08* (2006.01)
*G06N 20/00* (2019.01)

(52) U.S. Cl.
CPC .............. *H04L 1/08* (2013.01); *G06N 20/00* (2019.01); *H04L 67/12* (2013.01); *H04L 67/2823* (2013.01); *H04L 67/36* (2013.01)

(58) Field of Classification Search
CPC ....... H04L 1/08; H04L 67/36; H04L 67/2823; H04L 67/12; G06N 20/00
See application file for complete search history.

(56) References Cited

U.S. PATENT DOCUMENTS

| 9,154,826 | B2 | 10/2015 | Raleigh et al. | |
|---|---|---|---|---|
| 9,298,695 | B2 | 3/2016 | Hochman et al. | |
| 9,704,097 | B2 | 7/2017 | Devarajan et al. | |
| 2005/0075880 | A1* | 4/2005 | Pickover | G06F 40/253 704/270 |
| 2011/0294525 | A1* | 12/2011 | Jonsson | H04M 1/72552 455/466 |
| 2012/0101805 | A1* | 4/2012 | Barbosa | H04W 4/14 704/9 |
| 2013/0124962 | A1* | 5/2013 | Mitchell | G06F 40/103 715/229 |
| 2014/0358828 | A1 | 12/2014 | Phillipps et al. | |

(Continued)

OTHER PUBLICATIONS

Lin et al., "Automatic Protocol Format Reverse Engineering through Context-Aware Monitored Execution," NDSS, 2008 (17 pages).

(Continued)

*Primary Examiner* — Chris Parry
*Assistant Examiner* — Adam A Cooney
(74) *Attorney, Agent, or Firm* — Griffiths & Seaton PLLC

(57) ABSTRACT

Embodiments for intelligent communication message format automatic correction in a computing system by a processor. An appropriateness of the communication message formats is learned based on a plurality of factors for receiving communication messages from a communication system. A communication message, having one or more errors of a received communication message, may be automatically corrected according to the learned appropriateness of the communication messages.

18 Claims, 7 Drawing Sheets

(56) References Cited

U.S. PATENT DOCUMENTS

| | | | | |
|---|---|---|---|---|
| 2015/0058078 A1* | 2/2015 | Ehrenberg | | G06Q 10/04 |
| | | | | 705/7.31 |
| 2015/0113072 A1 | 4/2015 | Chan et al. | | |
| 2015/0317337 A1 | 11/2015 | Edgar | | |
| 2016/0063874 A1* | 3/2016 | Czerwinski | | G06F 40/166 |
| | | | | 434/236 |
| 2016/0337301 A1* | 11/2016 | Rollins | | H04L 51/02 |
| 2017/0076206 A1 | 3/2017 | Lastras-Montano et al. | | |
| 2017/0337176 A1* | 11/2017 | Cietwierkowski | | |
| | | | | G06F 3/04842 |
| 2017/0372232 A1* | 12/2017 | Maughan | | G06N 20/00 |
| 2018/0039608 A1* | 2/2018 | Sharifi | | H04L 51/16 |
| 2019/0213498 A1* | 7/2019 | Adjaoute | | G06N 3/02 |
| 2020/0053035 A1* | 2/2020 | Mukherjee | | H04L 51/12 |

OTHER PUBLICATIONS

Hanson, "Web Access for Elderly Citizens," WUAUC'01, May 22-25, 2001 (5 pages).

\* cited by examiner

INTELLIGENT COMMUNICATION MESSAGE FORMAT AUTOMATIC CORRECTION

BACKGROUND OF THE INVENTION

Field of the Invention

The present invention relates in general to computing systems, and more particularly, to various embodiments for intelligent communication message format automatic correction by a processor.

Description of the Related Art

In today's society, consumers, businesspersons, educators, and others communicate over a wide variety of mediums in real time, across great distances, and many times without boundaries or borders. The advent of computers and networking technologies have made possible the intercommunication of people from one side of the world to the other. Smartphones and other sophisticated devices that rest in the palm of a person's hand allow for the sharing of information between users in an increasingly user friendly and simple manner. The increasing complexity of society, coupled with the evolution of technology continue to engender the sharing of a vast amount of information such as, for example, communication messages sent and received between different computing systems.

SUMMARY OF THE INVENTION

Various embodiments of a cognitive system for intelligent communication message format automatic correction in a computing system by a processor are provided. In one embodiment, by way of example only, a method for intelligent communication message format automatic correction in a computing system, again by a processor, is provided. An appropriateness of the communication message formats is learned based on a plurality of factors for receiving communication messages from a communication system. A communication message, having one or more errors of a received communication message, may be automatically corrected according to the learned appropriateness of the communication messages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
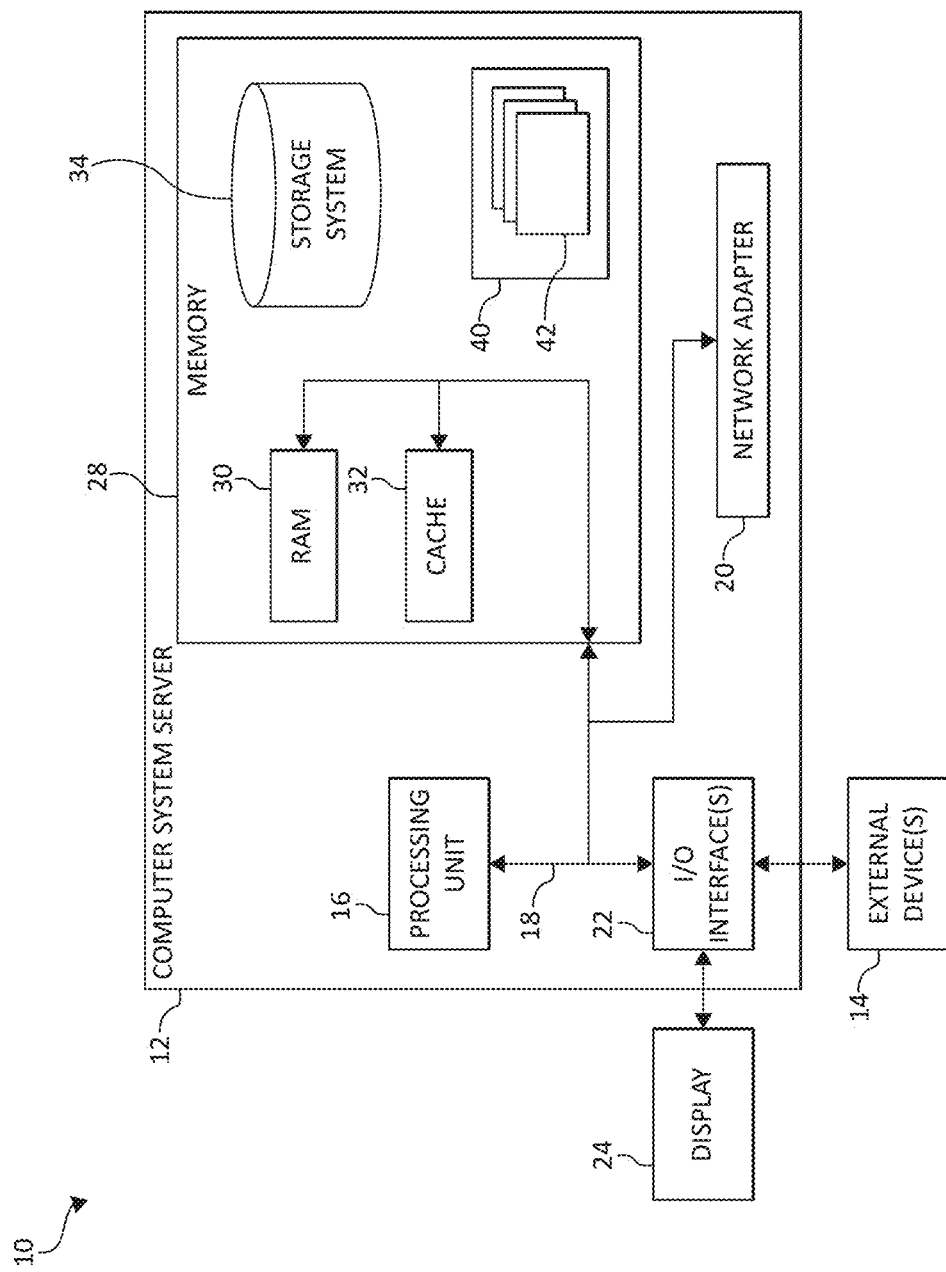
FIG. 1 is a block diagram depicting an exemplary cloud computing node according to an embodiment of the present invention.

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances or devices may include computers, smartphones, laptops, wearable devices, sensor devices, voice-activated devices, face-activated devices, digital assistants, home appliances, audio systems, televisions, security cameras, security sensors, among countless other examples. Such IoT computing systems may be employed in a variety of settings.

Often times, however, communication failures may occur between separate systems and also inside micro-service architecture systems due to mal-format or invalid parameters against specific constraints. For example, a monetary organization may receive Society for Worldwide Interbank Financial Telecommunication ("SWIFT") messages. Some messages may be received with format errors causing the receiving system to reject the messages and place the messages in a manual processing queue. An operation team member may consult with the business team on the appropriate decision. The decisions are either manual correction, re-insertion or, in case of large errors, rejection or acceptance and reporting the error to the sender. Many organizations use a specific service (whether in a micro-services architecture or a Service Oriented Architecture ("SOA")) whereby some of the organizations may not use an up-to-date version of a service communication interface model, which may cause rejection of inputs. The solution may be one of two. The first solution may be updating the system interface models, which would require long down time and much effort that leads in turn to the organization postponing the update, and resorting to the manual corrections of some of the rejected inputs. The second solution may be an operation team does the same as in the previous case, which is manual corrections or permanent rejection.

Accordingly, a need exists for intelligent communication message format automatic correction. In one aspect, the present invention provides for use of machine learning to teach a cognitive component, on the message receiver side, to automatically modify received messages with faults and compensate for these faults, without operator or sender intervention. In one aspect, the present invention focuses on receiver-side only auto-correction, in a communication system, whereby the messages exchanged are of a known defined structure. The cognitive component may be attached to an input part of a computing system in question. The cognitive component may learn one or more decisions of the operation/business team in a supervised learning fashion. The cognitive component may perform the learning offline using historical data. Then, the cognitive component may be employed to use the learned decisions under the supervision (intervention and corrections in case of errors) of the operation/business team until reaching a high level of accuracy (e.g., a determined accuracy above a selected threshold), which may be an intermediate one phase between the training and production (e.g., "on-the-job training" phase). Also, the "on-the-job training" phase may be an optional phase as the training offline.

In one aspect, the present invention provides for intelligent communication message format automatic correction in a computing system, by a processor. An appropriateness of the communication message formats is cognitively learned based on a plurality of factors for receiving communication messages from a communication system. A communication message, having one or more errors of a received communication message, may be automatically corrected according to the learned appropriateness of the communication messages.

The so-called "appropriateness" of communication, such as a message, may be very subjective and context, format, and/or message type dependent. A learned decision for correcting a communication format by the machine learning operation may be appropriate for a one type of message. However, the same learned decision may be deemed to be inappropriate (e.g., not relevant or does not correct the error) for correcting another communication message format. Thus, use of the machine learning will learn the most appropriate decision and auto-correct function for automatically modifying/correcting one or more received messages with faults and compensate for these faults so as to achieve a correction accuracy greater than a selected threshold or percentage. Accordingly, the so-called "appropriateness" of a particular communication may depend greatly upon contextual factors, such as the type of message, and other contextual factors such as the type of service communication interface models.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
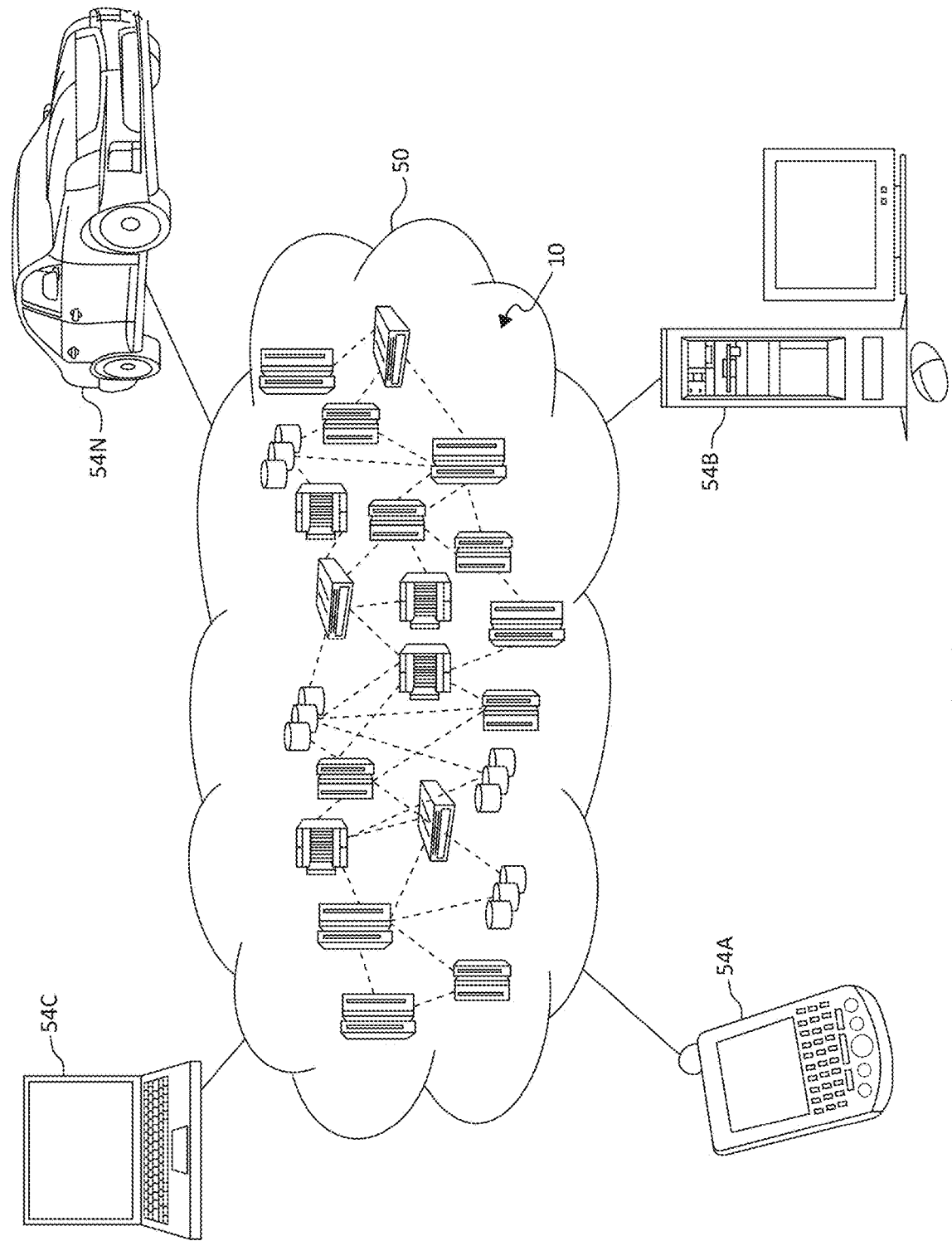
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
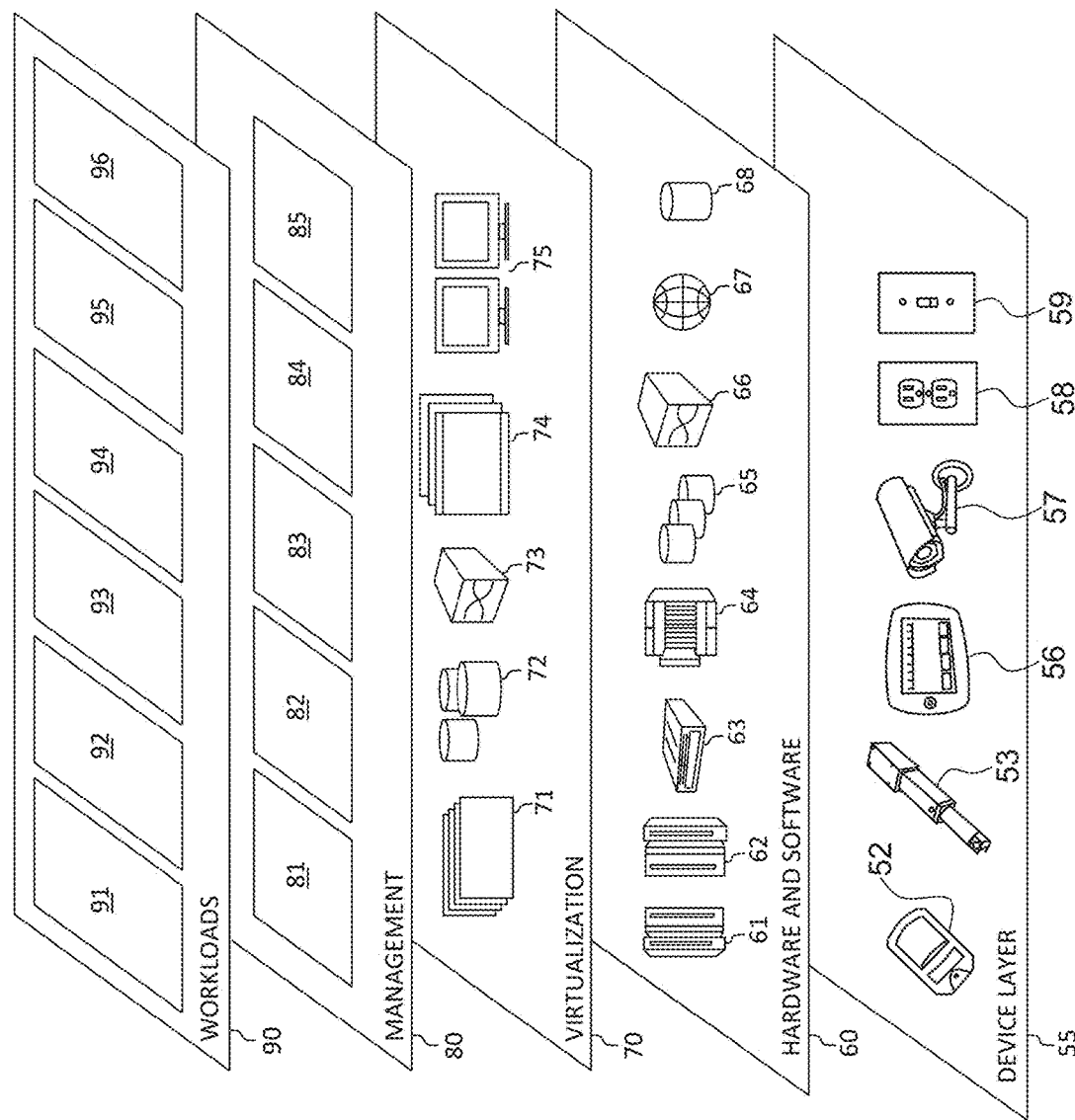
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "interne of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various intelligent message format automatic correction workloads and functions 96. In addition, intelligent message format automatic correction workloads and functions 96 may include such operations as data analytics, data analysis, and as will be further described, notification functionality. One of ordinary skill in the art will appreciate that the intelligent message format automatic correction workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for the monitoring and dissemination of communications to safeguard a user against submitting communication that the user may later regret to have submitted. These mechanisms include functionality that interprets the content of a particular message in terms of identified contextual factors, verifies an "appropriateness" of the message, and alerts the author or others providing the message when the content of the post in a certain setting could have potentially negative implications.

These mechanisms may use, in one embodiment, several identified contextual factors such as the author's profile, the type of audience, time and location of posting, and the like. The appropriateness checking functionality may be made against multifaceted factors such as country-specific laws, organizational policies, ethical and emotional impacts, determined negativity, and the like.

In addition to the social attributes of all parties involved in the communication in question, the parties' influence (e.g., number of followers/social eminence), current employment, etc., may also be considered to determine if the particular communications may have a negative impact to the user. In the event of an alert notification provided to the user, the mechanisms of the illustrated embodiments may provide the rationale behind the alert, enabling the user to either cancel the alert and proceed, or alter the communications accordingly. Should the user elect to proceed, the mechanisms may then require the user to provide feedback (e.g., reason, percentage of applicability/accuracy, etc.), which may be provided to a learning mechanism of the illustrated embodiments to adjust internal rules to improve the accuracy and enhance performance of the overall system.

The mechanisms of the illustrated embodiments provide, where applicable, alert notifications when the issuing of communications (e.g., social media post) may have a potential negative impact to the user, or to another party, which may result in loss of income, employment, legal implications, social implications, and so forth. The mechanisms are, among other aspects, rules driven, the development of these rules based on interpretation of the text of particular communication. In one embodiment, the rules may be adjusted towards sentiment analysis (e.g., opinion/negativity/emotional state/etc. of a particular communication) based on jurisdictional-specific rules or laws, geographic location, topic/thread, or other factors. A variety of cognitive, interpretive analysis in the context of a given communication may be utilized. Additionally, the mechanisms of the illustrated embodiments may consider still other factors such as social attributes/influence of all parties involved that may be used to determine the ultimate impact of a particular post in a social network, for example.

In view of the foregoing, the mechanisms of the illustrated embodiments provide, among other aspects, a cognitive mechanism to cognitively correct or modify one or more communication messages format/errors in a computing system. An appropriateness of the communication message formats is cognitively learned based on a plurality of factors for receiving communication messages from a communication system. A communication message, having one or more errors of a received communication message, may be automatically corrected according to the learned appropriateness of the communication messages.

Figure 4A:
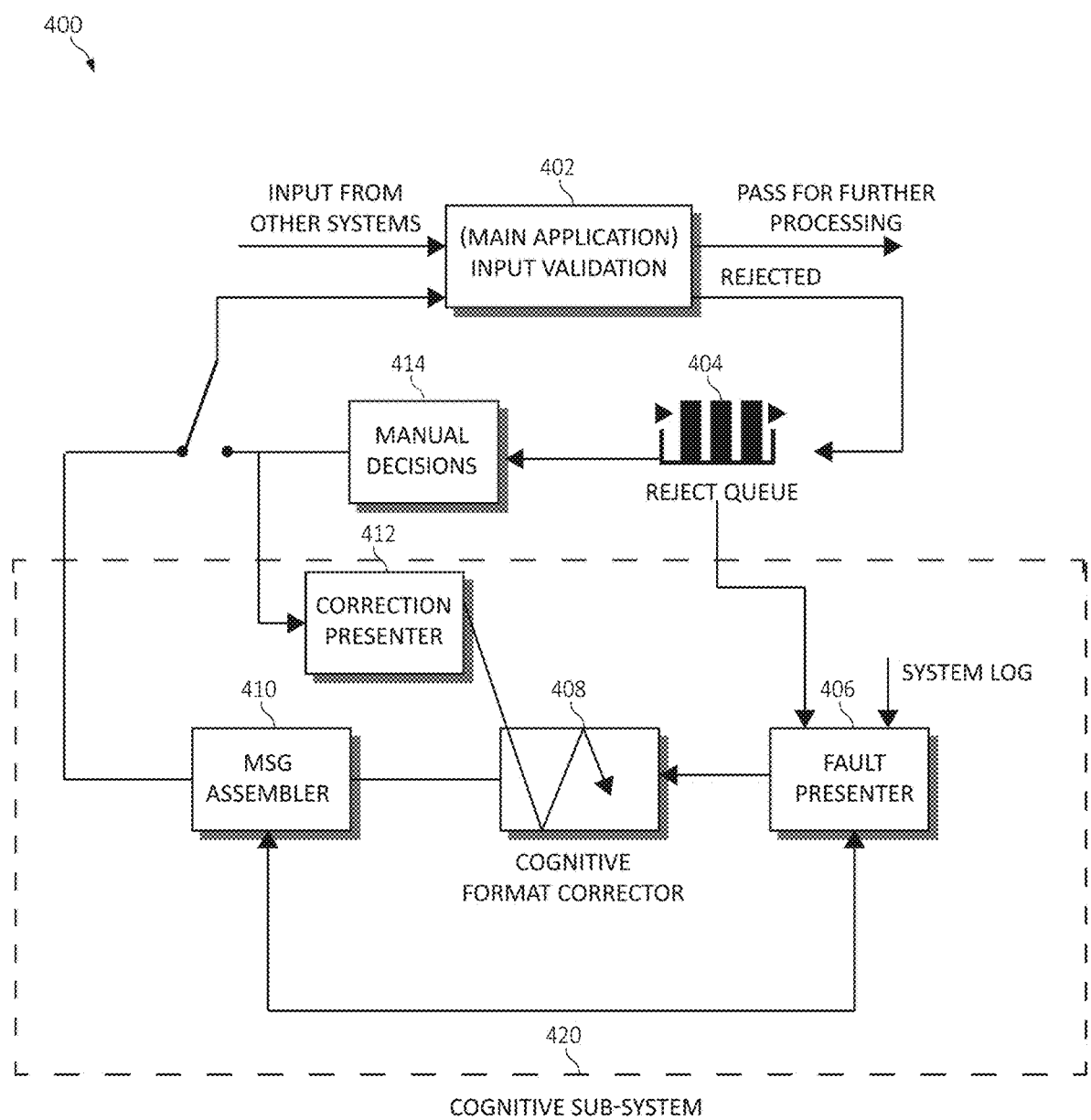
FIG. 4A is a block diagram depicting a dual operation mode for intelligent communication message format automatic correction in which various aspects of the present invention may be realized.
Figure 4B:
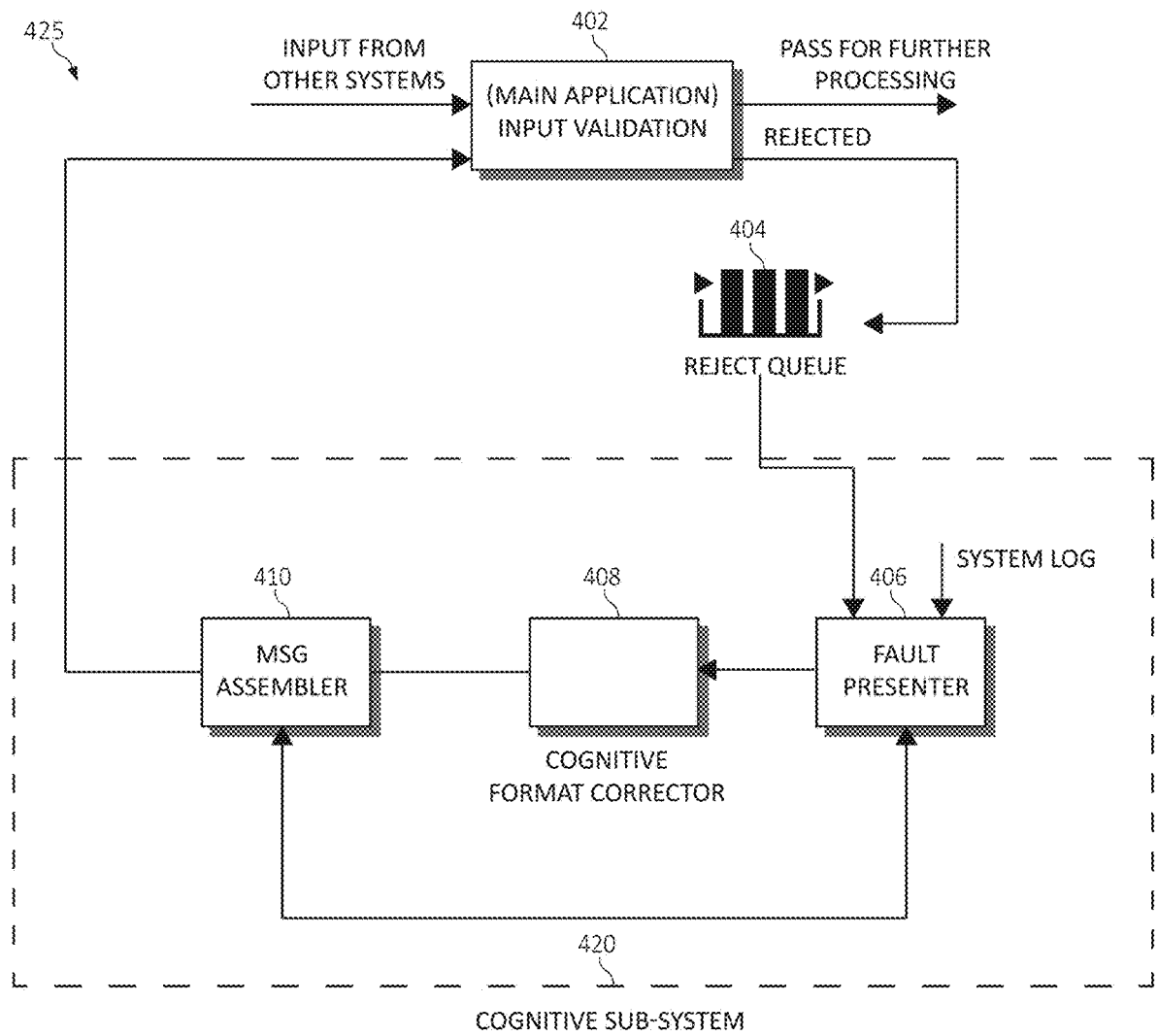
FIG. 4B is a block diagram depicting an exemplary production operation mode for intelligent communication message format automatic correction in which various aspects of the present invention may be realized.

Turning now to FIGS. 4A-4B, block diagrams depict exemplary functional components in computing systems 400, 425 according to various mechanisms of the illustrated embodiments. FIG. 4A illustrates a system 400 for a dual operation mode for intelligent communication message format automatic correction in a computing environment (e.g., a cloud computing environment), according to an example of the present technology. FIG. 4B illustrates a system 425 for a production operation mode for intelligent communication message format automatic correction in a computing environment (e.g., a cloud computing environment), according to an example of the present technology.

As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for cognitive data curation in accordance with the present invention. Many of the functional blocks 400 may execute as background processes on various components, either in distributed computing components, or on the user device, or elsewhere.

Turning now to FIG. 4A, computing system 400 may include a cognitive computing system 420 (e.g., cognitive sub-system) that may be attached to one or more different computing systems. For example, the cognitive computing system 420 may receive one or more inputs from other computing systems and output, via a main application 402, data for further processing.

In one aspect, the cognitive computing system 420 may include a fault presenter 406, a cognitive format corrector 408, a message ("MSG") assembler 410, and a correction presenter 412 (in association with one or more manual decisions 414), each of which may be described in more detail in FIG. 4B. The cognitive computing system 420 may be in communication with a rejection queue 404 and a main application 402. The cognitive computing system 420 may learn how one or more decisions (e.g., decisions and/or operations performed by an administrator, business team, or predefined rules) correct one or more errors in the input message format according to a selected organization message model and version.

In one aspect, to prepare the cognitive computing system 420 for production and automatic correction, the following steps may be used. To illustrate, assume one or more inputs (e.g., received messages/inputs from other computing systems) are received by the main application 402 (e.g., input validation) and one or more errors are detected. The rejected messages may be placed in a rejection queue 404. The cognitive computing system 420 may retrieve one or more rejected messages from the rejection queue 404 and the following steps may be used.

Step 1, the cognitive format corrector 408 may be trained offline first by preparing and using historical data of a system error log, one or more previously rejected messages, and any corresponding correction operations on the previously rejected messages. Step 2, the trained cognitive format corrector 408 may be employed in a dual-mode operation (e.g., manual correction and automatic correction ("auto-correction")). That is, the automatic correction mode may be performed under complete review of an administrator or group of supervisors (e.g., operation/business team). In the event there is an error in the cognitive component output from the cognitive computing system 420, one or more manual decisions 414 may be used to manually correct the cognitive component output and the cognitive computing system 420 may obtain a condensed offline training cycle that covers the error and the relevant versions of correction. Step 3, the trained cognitive format corrector 408 may be operated in a production mode (e.g., online) with one or more standardized reviews as any other component, as described in FIG. 4B. The dual-mode operation of FIG. 4A may also be a final or completed phase that permits human online manual corrections whenever needed. These manual corrections 414 may be followed by a training session of the cognitive format corrector 408 that may be automatically and dynamically initiated to teach the cognitive format corrector 408 the new correction.

Turning now to FIG. 4B, as stated previously, the cognitive computing system 420 may include the fault presenter 406, the cognitive format corrector 408, and the message assembler 410. The fault presenter 406 may function and play a role in both the training phase (see FIG. 4A) and the production phase (see FIG. 4B). The fault presenter 406 may be responsible for creating the input to the cognitive format corrector 408. In one aspect, the process of creating the input and obtaining the fully corrected message (for a rejected message having one or more errors) may be incrementally performed. After reading the message, the fault presenter 406 loops on the faults in the message that it has extracted from the corresponding part of the error log. That is, the fault presenter 406 reads the faults from the log file in a loop to present the fault to the cognitive format corrector. For each fault, the fault presenter 406 receives a fault code and converts both the fault code and the fault/error (e.g., a faulty statement of the message) to a predefined format (e.g., a learned format). The fault presenter 406 may also associate a formatted fault code with the faulty statement and forward the formatted fault code with the faulty statement as the input to the cognitive format corrector 408 component. The output of each input may be the corrected statement of the message. The corrected statements of the same message may be accumulated to form a complete corrected message before it is re-entered to the main business application via the message assembler 410.

Turning back to the training phase of FIG. 4A, it should be noted that the correction presenter 412 may be a component having functionality and a role similar to the role of the fault presenter 406 component, but only in the training phase (e.g., FIG. 4A). The correction presenter 412 may be responsible for the presentation of a reference output and/or the correct output needed for the supervised learning process of the cognitive computing system 420. As a main part of the correction presenter 412, a user interface may be employed and used by a human corrector to do the manual correction. The user interface of the correction presenter 412 may display the faulty statement and the fault description and code to the human corrector. The correction presenter 412 may also provide the human corrector one or more options for the correction decisions and may then execute the selected decision. In addition to the execution of the manual correction, the correction presenter 412 component may synchronize one or more manual correction decisions with the corresponding faults extracted by the fault presenter 406 component and format the manual correction decisions in the predefined format. The correction presenter 412 may present the correction decisions as part of each iteration inputs.

For an offline training of FIG. 4A, the correction presenter 412 component may obtain one or more manual correction decisions 414, format the one or more manual correction decisions, associate the one or more manual correction decisions with the corresponding fault codes, and then generate a labeled message file that contains the faulty message with the formatted fault code and correction decision. The labeled files may be used as the only input to an offline training operation.

Returning back to FIG. 4B, the message ("MSG") assembler 410 may be a component that, in conjunction with the other components (e.g., the fault presenter 406, the cognitive format corrector 408, and/or the correction presenter 412), may accumulate the corrected statements to form a complete corrected message.

The cognitive format corrector 408 may be a component that is the primary operative component of the cognitive computing system 420. The cognitive format corrector 408 may learn and model a format correction process via a machine learning operation that learns, during a training cycle, one or more decisions from a human corrector. That is, the cognitive format corrector 408 may employ one or more machine learning operations and/or one or more cognitive applications (e.g., NPL, artificial intelligence (AI), machine learning, IBM® Watson® Alchemy Language (IBM Watson and Alchemy are trademarks of International Business Machines Corporation)).

The learning may occur by the cognitive format corrector 408 executing a machine learning process in the training phase to train a cognitive auto-correct model. The cognitive format corrector 408 may use the trained cognitive auto-correct model in a production phase to correct the input faulty messages (e.g., received messages from one or more computing systems, which may be external to and/or internal with the cognitive computing system 420).

In view of the operations of computing systems 400, 425 of FIGS. 4A-B, consider, as an illustration of exemplary use cases, the following. In use case 1, assume bank A sends a SWIFT message to bank B. Bank B has not upgraded the SWIFT version on the computing system of bank B. The receiving system at bank B rejects the message. The cognitive computing system 420 may receive/obtain the rejected message and any relevant error codes from an error log (e.g., system log). The cognitive computing system 420 may correct the message, as described in FIGS. 4A and/or 4B. The generated corrected message may be entered again to the receiving system at bank B. The message may be accepted by the computing system of bank B and passed for further processing at bank B.

Turning now to use case 2, assume system A receives an Extensible Markup Language ("XML") message. Assume system A works under one or more security rules (e.g., Payment Card Industry "PCI"-compliance) that mandates encrypting a specific field value. System A rejects the message because system A detects the specific field value is not encrypted. The cognitive computing system 420 may receive/obtain the rejected message and any relevant error codes from an error log (e.g., system log). The output of the cognitive computing system 420 may, in this case, initiate a routing in the message assembler 410 component that sends a message field in question to be encrypted. The message assembler 410 may output the corrected message that has the encrypted field to be entered again to system A. System A accepts the message and may pass it further, as output, to the next step of the business process (e.g., pass for further processing).

It should be noted that, the cognitive computing system 420, using a machine learning operation, may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMIDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
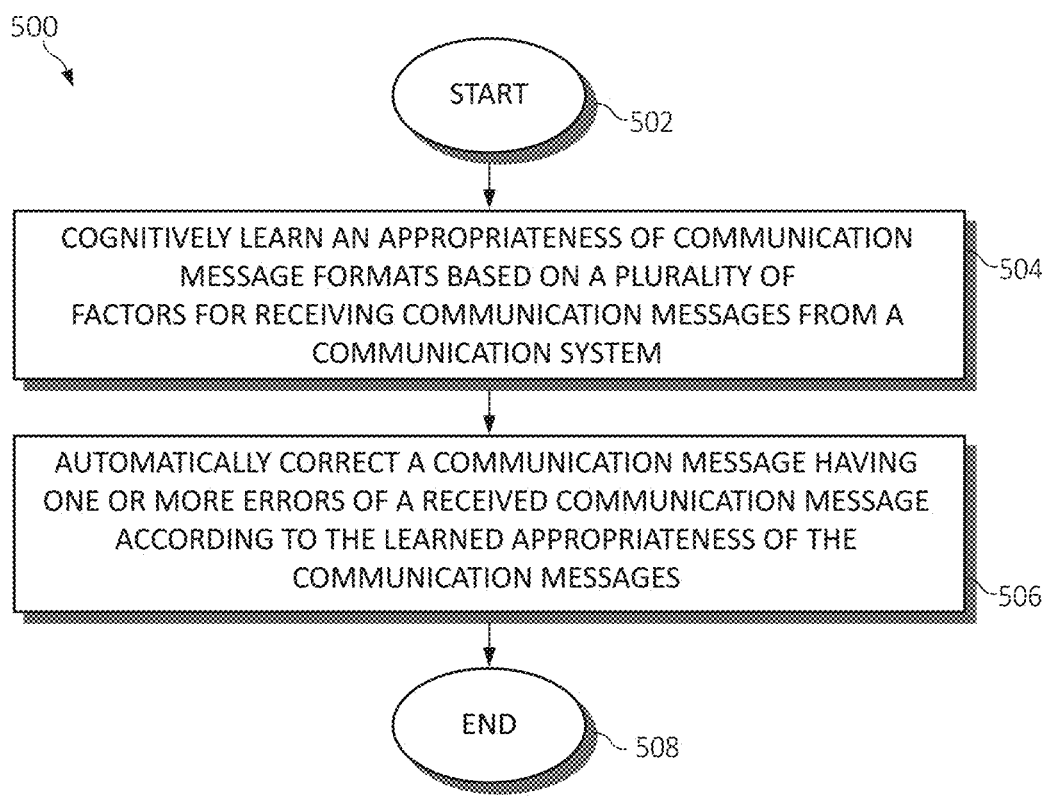
FIG. 5 is a flowchart diagram depicting an additional exemplary method for intelligent communication message format automatic correction in a computing environment by a processor in which aspects of the present invention may be realized.

Turning now to FIG. 5, a method 500 for intelligent communication message format automatic correction by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium. As one of ordinary skill in the art will appreciate, the various steps depicted in method 500 may be completed in an order or version differing from the depicted embodiment to suit a particular scenario.

The functionality 500 may start in block 502. An appropriateness of the communication message formats is cognitively learned based on a plurality of factors for receiving communication messages from a communication system, as in block 504. A communication message, having one or more errors of a received communication message, may be automatically corrected according to the learned appropriateness of the communication messages, as in block 506. The functionality 500 may end, as in block 508.

Figure 6:
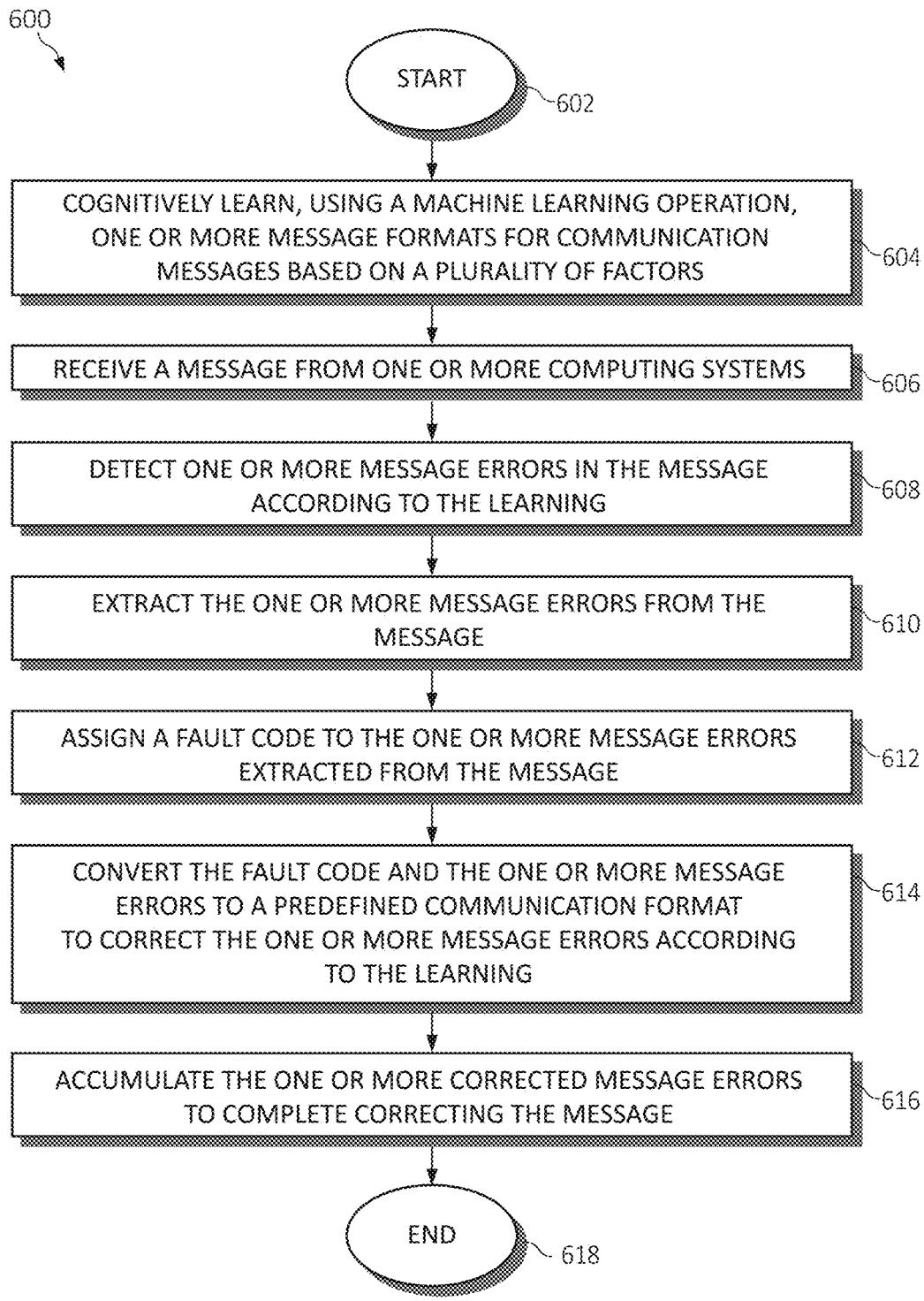
FIG. 6 is a flowchart diagram depicting an additional exemplary method for intelligent communication message format automatic correction in a computing environment by a processor, again in which aspects of the present invention may be realized.

Turning now to FIG. 6, a method 600 for intelligent communication message format automatic correction by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. As one of ordinary skill in the art will appreciate, the various steps depicted in method 600 may be completed in an order or version differing from the depicted embodiment to suit a particular scenario.

The functionality 600 may start in block 602. One or more message formats may be cognitively learned, using a machine learning operation, for communication messages based on a plurality of factors, as in block 604. A message (e.g., communication message) may be received from one or more computing systems, as in block 606. One or more message errors may be detected in the message according to the learning, as in block 608. The one or more message errors may be extracted from the message, as in block 610. A fault code may be assigned to the one or more message errors extracted from the message, as in block 612. The fault code and the one or more message errors may be converted (e.g., corrected) to a predefined communication format to correct the one or more message errors according to the learning, as in block 614. The one or more corrected message errors may be accumulated to complete correcting the message, as in block 616. The functionality 600 may end in block 618.

In one aspect, in conjunction with and/or as part of at least one block of FIGS. 5-6, the operations of methods 500 and 600 may include each of the following. The operations of methods 500 and 600 may learn a plurality of decisions relating to correcting each communication message using a machine learning operation. Historical data may be used during a training cycle for the learning using a machine learning operation. The operations of methods 500 and 600 may learn, via a machine learning operation, one or more correction operations for correcting one or more rejected messages using the historical data according to one or more message models and message versions, wherein the historical data includes one or more system error logs, the rejected messages, and one or more correction actions to correct the rejected messages.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for intelligent communication message format automatic correction in a computing system by a processor, comprising:

receiving historical data associated with communication message formats of communication messages transacted in a communication system;

training a cognitive auto-correct model of a machine learning operation, during an offline training phase, according to the received historical data, wherein, during the training, the cognitive auto-correct model learns an appropriateness of the communication message formats based on a plurality of factors for receiving the communication messages from the communication system, and wherein learning the appropriateness includes learning a schema of the communication messages structured in a specific one of the communication message formats; and responsive to training the cognitive auto-correct model, automatically correcting a communication message having one or more errors in the schema, at a receiver-side of the communication message during an online production phase, according to the learned appropriateness of the communication messages.

2. The method of claim 1, wherein learning the appropriateness of communication message formats based on the plurality of factors further includes learning a plurality of decisions relating to correcting each communication message using the machine learning operation.

3. The method of claim 1, wherein learning the appropriateness of communication message formats based on the plurality of factors further includes learning, via the machine learning operation, one or more correction operations for correcting one or more rejected messages using the historical data according to one or more message models and message versions, wherein the historical data includes one or more system error logs, the rejected messages, and one or more correction actions to correct the rejected messages.

4. The method of claim 1, further including assigning a fault code to a communication message error extracted from the received communication message, wherein the fault code is associated with the communication message error.

5. The method of claim 4, further including converting the fault code and the communication message format error to a predefined communication format.

6. The method of claim 1, further including accumulating one or more corrected communication errors to complete correcting the communication message.

7. A system for intelligent communication message format automatic correction in a computing system, comprising:

one or more computers with executable instructions that when executed cause the system to:

receive historical data associated with communication message formats of communication messages transacted in a communication system;

train a cognitive auto-correct model of a machine learning operation, during an offline training phase, according to the received historical data, wherein, during the training, the cognitive auto-correct model learns an appropriateness of the communication message formats based on a plurality of factors for receiving the communication messages from the communication system, and wherein learning the appropriateness includes learning a schema of the communication messages structured in a specific one of the communication message formats; and responsive to training the cognitive auto-correct model, automatically correct a communication message having one or more errors in the schema, at a receiver-side of the communication message during an online production phase, according to the learned appropriateness of the communication messages.

8. The system of claim 7, wherein the executable instructions, pursuant to learning the appropriateness of communication message formats based on the plurality of factors, further learn a plurality of decisions relating to correcting each communication message using the machine learning operation.

9. The system of claim 7, wherein the executable instructions, pursuant to learning the appropriateness of communication message formats based on the plurality of factors, further learn, via the machine learning operation, one or more correction operations for correcting one or more rejected messages using the historical data according to one or more message models and message versions, wherein the historical data includes one or more system error logs, the rejected messages, and one or more correction actions to correct the rejected messages.

10. The system of claim 7, wherein the executable instructions further assign a fault code to a communication message error extracted from the received communication message, wherein the fault code is associated with the communication message error.

11. The system of claim 10, wherein the executable instructions further convert the fault code and the communication message format error to a predefined communication format.

12. The system of claim 7, wherein the executable instructions further accumulate one or more corrected communication errors to complete correcting the communication message.

13. A computer program product for intelligent communication message format automatic correction by a processor, the computer program product comprising a non-transitory computer-readable storage medium having computer-readable program code portions stored therein, the computer-readable program code portions comprising:

an executable portion that receives historical data associated with communication message formats of communication messages transacted in a communication system;

an executable portion that trains a cognitive auto-correct model of a machine learning operation, during an offline training phase, according to the received historical data, wherein, during the training, the cognitive auto-correct model learns an appropriateness of the communication message formats based on a plurality of factors for receiving the communication messages from the communication system, and wherein learning the appropriateness includes learning a schema of the communication messages structured in a specific one of the communication message formats; and an executable portion that, responsive to training the cognitive auto-correct model, automatically corrects a communication message having one or more errors in the schema, at a receiver-side of the communication message during an online production phase, according to the learned appropriateness of the communication messages.

14. The computer program product of claim 13, further including an executable portion that, pursuant to learning the appropriateness of communication message formats based on the plurality of factors, learns a plurality of decisions relating to correcting each communication message using the machine learning operation.

15. The computer program product of claim 13, further including an executable portion that, pursuant to learning the appropriateness of communication message formats based on the plurality of factors,
    learns, via the machine learning operation, one or more correction operations for correcting one or more rejected messages using the historical data according to one or more message models and message versions, wherein the historical data includes one or more system error logs, the rejected messages, and one or more correction actions to correct the rejected messages.

16. The computer program product of claim 13, further including an executable portion that, pursuant to learning the appropriateness of communication message formats based on the plurality of factors, assigns a fault code to a communication message error extracted from the received communication message, wherein the fault code is associated with the communication message error.

17. The computer program product of claim 16, further including an executable portion that, pursuant to learning the appropriateness of communication message formats based on the plurality of factors, converts the fault code and the communication message format error to a predefined communication format.

18. The computer program product of claim 13, further including an executable portion that, pursuant to learning the appropriateness of communication message formats based on the plurality of factors, accumulates one or more corrected communication errors to complete correcting the communication message.

* * * * *